(12) United States Patent
Stiller

(10) Patent No.: US 6,745,614 B2
(45) Date of Patent: Jun. 8, 2004

(54) METHOD FOR DETECTING A LEAKAGE IN AN AIR SPRING SYSTEM OF A MOTOR VEHICLE

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/383,526

(22) Filed: Mar. 10, 2003

(65) Prior Publication Data

US 2003/0182990 A1 Oct. 2, 2003

(30) Foreign Application Priority Data

Mar. 8, 2002 (DE) .......................... 102 10 371
Jan. 11, 2003 (DE) .......................... 103 00 737

(51) Int. Cl.$^7$ .......................... G01M 3/04; G01M 17/04
(52) U.S. Cl. .......................... 73/40; 73/49.7; 73/11.04
(58) Field of Search .......................... 73/40, 49.7, 37, 73/11.04

(56) References Cited

U.S. PATENT DOCUMENTS

| | | | | |
|---|---|---|---|---|
| 5,142,897 | A | 9/1992 | Pischke et al. | ................ 73/1 J |
| 6,173,974 | B1 * | 1/2001 | Raad et al. | ............... 280/6.157 |
| 6,418,363 | B2 * | 7/2002 | Cochofel et al. | ............. 701/37 |
| 6,470,248 | B2 * | 10/2002 | Shank et al. | ................... 701/37 |

* cited by examiner

*Primary Examiner*—Hezron Williams
*Assistant Examiner*—Rodney Frank
(74) *Attorney, Agent, or Firm*—Walter Ottesen

(57) ABSTRACT

A method detects leakages in a motor vehicle air spring system which includes a plurality of air springs and has a level control arrangement. The level control arrangement includes: an electronic control apparatus; a plurality of elevation determination sensors associated with corresponding ones of the air springs; a pressure sensor; a plurality of air spring valves corresponding to respective ones of the air springs and a compressor. The elevation determination sensors and the pressure sensor are connected to the control apparatus for supplying signals thereto. The control apparatus functions to process the signals for controlling the air spring valves and the compressor for controlling the motor vehicle upwardly or downwardly in elevation.

13 Claims, 5 Drawing Sheets

METHOD FOR DETECTING A LEAKAGE IN AN AIR SPRING SYSTEM OF A MOTOR VEHICLE

BACKGROUND OF THE INVENTION

The invention proceeds from a motor vehicle air spring system having a level control arrangement. Air spring systems with level control arrangements are known in various configurations.

U.S. Pat. No. 5,142,897 discloses an arrangement for level control for a vehicle having air springs. The elevation signals of the elevation sensors are filtered at a time constant in order to improve the control performance of the arrangement. An elevation change is either caused by a load change or by a leak in an air spring. In control operations, usually there is no differentiation as to whether a control request takes place because of a changed load state or because of a leakage.

SUMMARY OF THE INVENTION

It is an object of the invention to provide a method for detecting especially medium size leaks in a motor vehicle air spring system, that is, with a control, for example, the desired level can still be reached.

The essence of the arrangement according to the invention is a function logic for detecting leakages in the level-controlled air spring system. This function logic is part of the level control arrangement. The operation of this logic is based on a separate treatment of the level control in different driving states.

The operation of the function logic will now be described.
(a) Ignition is Switched Off.

In this state, the level control apparatus switches off after an after-run time of, for example, five minutes. Thereafter, the control apparatus (SG) awakens time controlled, for example, after two hours, and then, for example, after five hours again in order to evaluate the control deviation. If it is detected that the vehicle is too low at least at one vehicle corner (lower threshold value elevation level reached or there is a drop therebelow), the vehicle is controlled at all vehicle corners to the desired level within the tolerance limits or threshold values. Thereafter, the control apparatus switches into the sleep mode.
(b) Ignition of the Vehicle is Switched On.

A continuous level monitoring takes place by the control apparatus (SG). If the tolerance limits are exceeded (for example, there is a drop below the threshold value $h_{su}$) the vehicle is again controlled to the desired level.

With respect to (a), the detection logic according to the invention for detecting leakages in the individual air springs during control apparatus after-run.

When the ignition is switched off (KL15-off) and after the elapse of a fixed time span (for example, five minutes), the control apparatus goes into the sleep mode (current save mode). Before the control apparatus goes into the sleep mode, the air pressure $p_1$ for each air spring (VL, VR, HL, HR) and the distance $h_1$ (VL, VR, HL, HR) is measured in the air springs from wheel to wheel at time point $t_1$ in accordance with the method of the invention and is stored together with the time $t_1$. With a renewed awakening of the control apparatus (movement out of the current save mode), only with the detection of an up control requirement at time point $t_2$ (that is, there is a drop below the lower threshold value $h_{su}$), the air pressures $p_2$ (VL, VR, HL, HR) are measured in the individual air springs.

For specific circuit arrangements, it is especially advantageous to only then determine the air pressures $p_2$ when there is a drop below the lower threshold value $h_{su}$ of the elevation level at least one vehicle corner. In these circuit arrangements, an air exchange can take place with the corresponding lines and, if required, with the connected air drive for each pressure measurement in an air spring insofar as a pressure drop exists between the pressure in the air spring bellows and the components connected for the pressure measurement. The volume of an air dryer amounts normally to approximately 200 to 300 cm³. If the air dryer, for example, has a pressure close to atmospheric pressure, then a drop of the elevation level at the vehicle corner of this air spring bellows is possible when there is an air exchange and a pressure compensation with the connected air spring bellows. In an unfavorable case, a drop of the vehicle corner could take place and lead to a detection of leakage during the determination of a leakage in the sequence of first carrying out a pressure measurement and then determining the elevation level because of the above-described air exchange and pressure compensation with the connected lines and components. In the determination of the leakage in the reverse sequence, this is reliably avoided (first determining the elevation level and then, when necessary, making the pressure measurement) whereby pressurized air and energy are saved.

For evaluating the condition, that air spring is used for the evaluation at whose axle a control requirement was detected and that air spring is selected which lies the lowest, that is, which has the lowest value of $h_2$. The conditions for the air spring selected in this manner are as follows:

Condition 1: $(p_1-p_2)>K_1$ wherein $K_1 \geq 0$ (Wheel load has not increased, for example, $K_1=0$ bar) and Condition 2: $\{h(t_1)-h(t_2)\}*K_3/(t_2-t_1)>K_2$ wherein $K_2>0$ and $K_3>0$ (Elevation level at the corresponding air spring has not decreased, for example, $K_2=1/s$ and $K_3=10/mm$) and, Condition 3: $(t_2-t_1)<T_{Limit}$ (Time condition in which a leak can be detected).

If the above conditions are satisfied, a leakage at this air spring is detected and a wheel-specific counter $Z_T$ is incremented. If, in contrast, no control requirement is detected at $t_2$ (that is, there is no drop below threshold value $h_{su}$ of the corresponding air spring), the corresponding wheel-specific counters $Z_T$ (VL, VR, HL, HR) are decremented, preferably, minimally to the value 0.

At $T_{Limit}$, it can be inputted how large the leak should be so that this leak can still be detected. The greater $T_{Limit}$ is, the lower the leakage values which still can be detected and the lower $T_{Limit}$ is, the greater the leakage has to be in order to still be detected via the conditions.

If a wheel-specific counter $Z_T$ exceeds a threshold value $K_4$ (for example, the value 4), a leakage fault is detected. A leakage fault is displayed optically and/or acoustically in the interior of the vehicle. The particular leakage fault can be displayed wheel-specifically and/or as a fault for the entire air spring system. A leakage fault is preferably stored in the control apparatus in a permanent memory in order to make it available for later analysis and repair purposes.

For multiple awakening operations, the method is correspondingly repeated in that the values at the instantaneous time point are again assigned to the time point $t_2$ and to the past time point, the time point $t_1$. That is, as a new time point $t_1$, the last time point $t_2$ is selected at which the control apparatus was transferred from the active state into the sleep mode. The new time point $t_2$ is selected time-controlled after a pregiven time span of, for example, three hours when the control apparatus is again transferred out of the sleep mode into the active state.

Variations:

The time point $t_1$ does not have to be necessarily determined with the first transfer of the control apparatus after the switchoff of the ignition (KL15=off) into the sleep mode; instead, the time point $t_1$ can be determined also, for example, with the first awakening of the control apparatus (leaving the sleep mode) and the detection of a control need, that is, there is a drop below the threshold value $h_{su}$ of at least one air spring. The time point $t_2$ shifts then to the next awakening of the control apparatus. The reason is that a separately initiated pressure measurement causes disturbing noises. At the start of each control operation, however, a pressure measurement is anyway carried out. With this variation, no additional pressure measurements (valve switching) are therefore necessary. Furthermore, effects because of the cooling of the air springs can be precluded in that $t_1$ is so selected that the air spring is cooled down.

With respect to condition (b), the detection logic of the invention for detecting leaks in the air spring bellows with the ignition switched on are now discussed.

A condition precedent for the activation of the subsequent logic is that an up-control operation was triggered for the switched-on ignition (KL15=An) which was not triggered because of a change of the desired level (manual level adjustment). If such a control operation took place at time point $t_1$, the air pressures $p_1$ in the air spring bellows and the time point $t_1$ are stored at the beginning of the control operation or with the detection of a drop below threshold value $h_{su}$. The time point $t_2$ identifies the time point when the next control requirement is detected, that is, there is a drop below threshold value $h_{su}$ and an up-control operation is triggered. At this time point $t_2$, before the start of the up control, the pressures $p_2$ are measured. When the conditions 1 and 3 are satisfied, the corresponding wheel-individual counter is incremented. To evaluate the leakage, that air spring is used in accordance with the method of the invention at whose axle the up control requirement was detected and that air spring is selected at which the vehicle body is at the lowest with respect to elevation, that is, where the lowest value of $h_2$ is present.

The wheel-individual counters are time controlled decremented with a value>$\Delta t = t_2 - t_1$, for example, every hour (therefore, $\Delta t = 1$ h) or $\Delta t = 2*(t_2 - t_1)$, or when a leakage is not detected at the corresponding air spring, if in this time span, or during the leakage detection, the valves of the corresponding air springs were not actuated. Preferably, the wheel-specific counters are decremented down to the value 0.

If a wheel-individual counter exceeds a threshold value $K_4$, a leakage fault is detected which is allocated to the corresponding air spring.

According to the invention, the monitoring takes place only for pressure changes in order to exclude level changes because of changes of load. In order to eliminate influences caused by temperature, the time span between $t_2$ and $t_1$ is to be so selected that elevation changes caused by temperature influences still do not lead to exceeding the control hysteresis, that is, this does not lead to a crossing of the upper and lower threshold values $h_{so}$ and $h_{su}$.

Compared to air springs which are provided with a conventionally functioning level control arrangement, the method and arrangement of the invention afford the advantage that air spring leakages can be detected for the first time. Only an elevation sensor in the individual air spring bellows and a pressure sensor are conditions precedent.

A further advantage is that not only the basic detection of a leak in the arrangement is possible; rather a localization of the leak can also be undertaken, for example, air spring forward left (VL), et cetera.

It is further advantageous that a wheel-specific counter is incremented with the detection of a leak at an air spring. In this way it is possible to monitor the time-dependent course of the wheel-specific leakage.

A still further advantage is that a leakage fault is detected at an air spring only after a threshold value is exceeded. In this way, a defective detection of leakage because of elevation signal fluctuations caused, for example, by load changes and vibration excitations during travel or temperature fluctuations is substantially avoided.

A further advantage of the invention is that the pressure measurement is only undertaken after the evaluation of the elevation signals. There must be a drop below the lower elevation threshold value at least at one vehicle corner. In this way, pressurized air and energy are saved.

Finally, an indication as to a leak and/or a leakage fault can be stored in a permanent fault memory of the control apparatus for the purpose of providing information at a service center.

Acoustic or visual display of the leak in the interior of the vehicle for the driver is advantageous. The driver is informed directly as to the state of the level control arrangement and can take corresponding safety relevant steps, for example, by driving more slowly.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
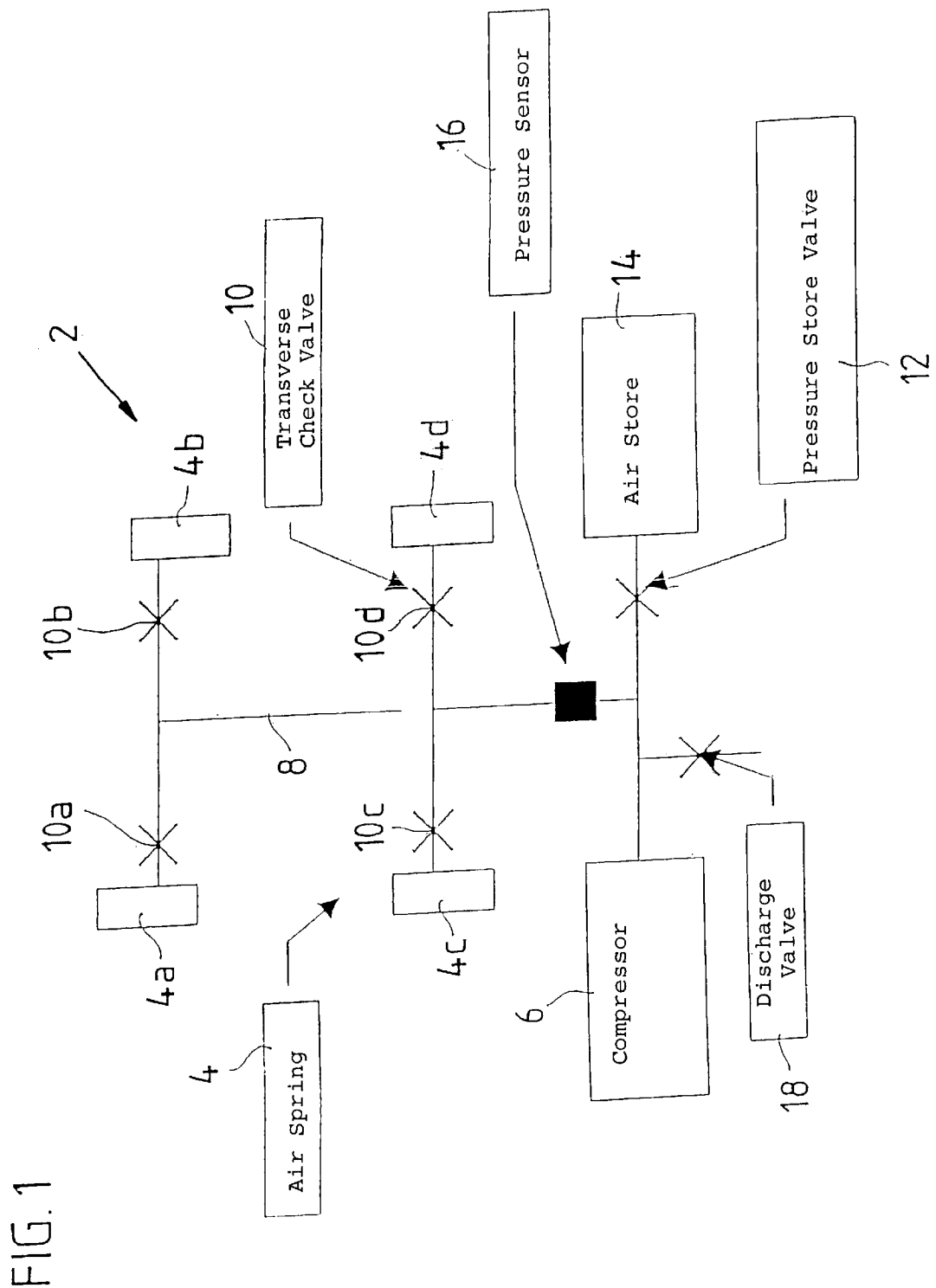
FIG. 1 is a schematic showing a motor vehicle air spring system.

FIG. 1 shows an air spring system with a level control for a motor vehicle. The air spring system 2 of FIG. 1 comprises four air springs (4a, 4b, 4c, 4d) which are assigned to the four vehicle wheels for supporting the chassis. The air springs (4a, 4b, 4c, 4d) are supplied with pressurized air from a common compressor 6 (compressor relay 20) via pressure lines 8. The individual air springs (4a, 4b, 4c, 4d) can be blocked with the aid of transverse check valves (10a, 10b, 10c, 10d). The air spring system 2 further includes an air store (pressure store) 14, which can be blocked by a pressure storage valve 12, a pressure sensor 16 and a discharge valve 18. The individual air springs (4a, 4b, 4c, 4d) have elevation sensors (22a, 22b, 22c, 22d) whose signals are evaluated by a level control unit (not shown).

Figure 2:
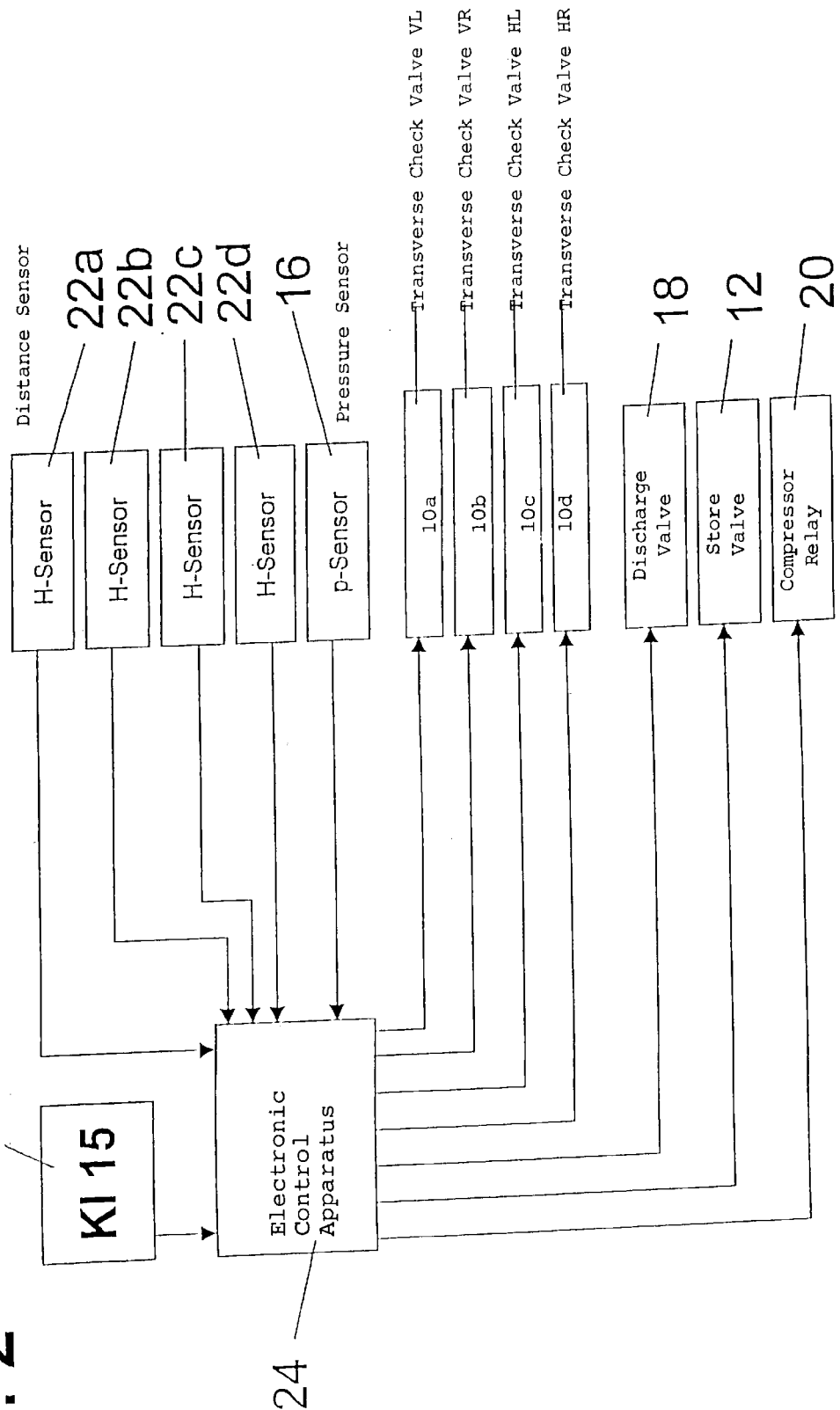
FIG. 2 is a block diagram showing the signal detection for controlling a pneumatic level adjusting unit.

Reference is made to FIG. 2 with respect to signal detection and coupling to the valves to be controlled.

The signals provided by the four elevation sensors (22a, 22b, 22c, 22d) and the pressure sensor 16 are supplied to an electronic control apparatus 24 which is connected to the ignition KL15 identified in FIG. 2 by reference numeral 26.

In the control apparatus 24, the signals are processed for the purpose of controlling the valves (10a, 10b, 10c, 10d, 12, 18) and a compressor relay 20.

Figure 3A:
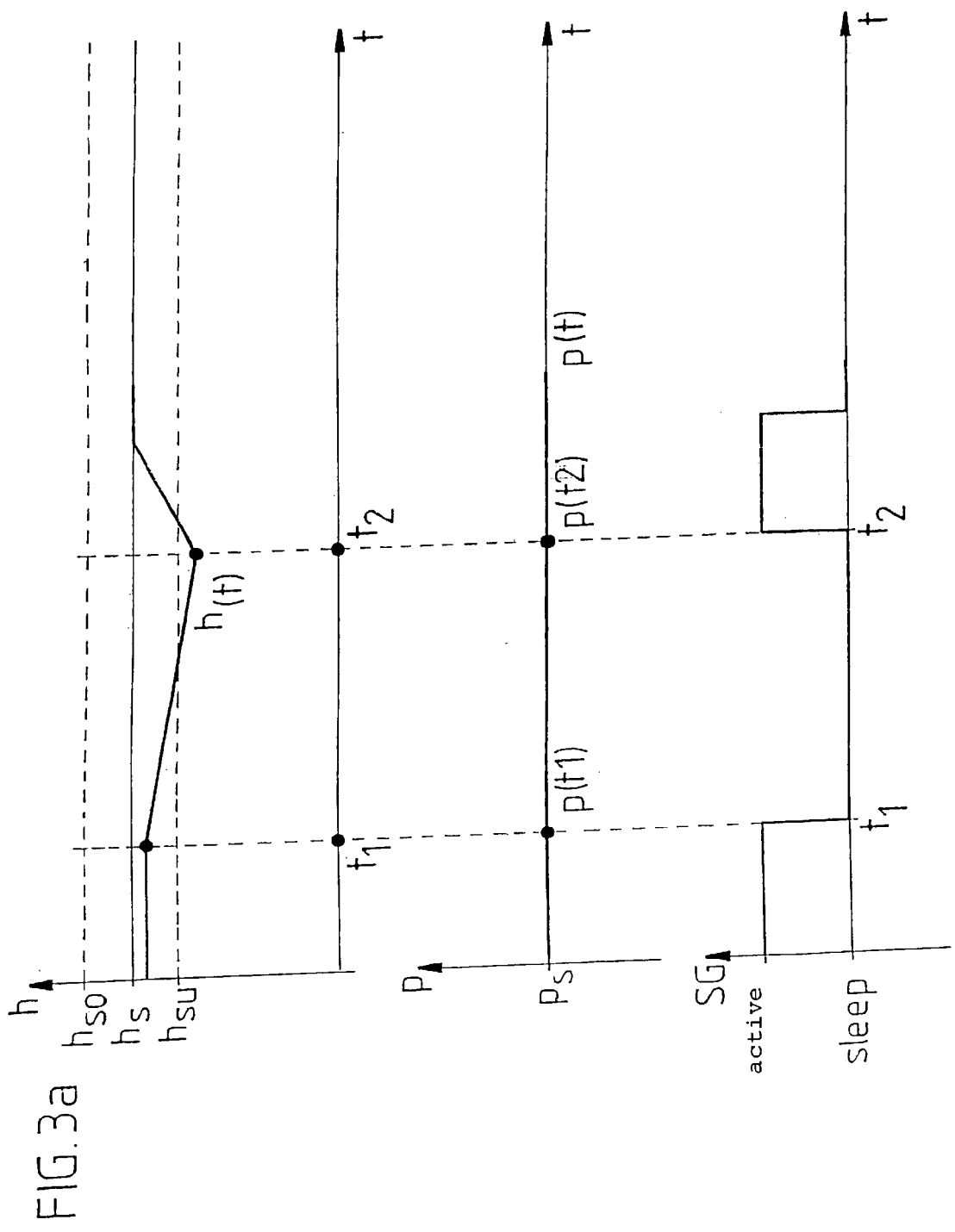
FIG. 3a is a plot showing the elevation signal state, pressure state and SG-state plotted as a function of time in accordance with a first time sequence.

FIG. 3a shows the time-dependent trace of the elevation signal (h) and of the pressure (p) of an air spring as well as the time-dependent trace of the state of the control apparatus SG. The desired level of elevation $h_s$ of the air spring is limited by the upper threshold value $h_{so}$ and the lower threshold value $h_{su}$. The time-dependent trace of the actual level elevation of the air spring is shown in the form of a thick line h(t). At time point $t_1$, the actual level elevation $h_1$ lies between the desired level elevation $h_s$ and the lower threshold value $h_{su}$. The pressure $p(t_1)$ at time point $t_1$ is shown in the center diagram of the pressure plotted against time. In the embodiment shown, the pressure $p(t_1)$ corresponds precisely to the desired pressure $p_s$. No pressure threshold values are shown which can of course be present so that even slight pressure differences between the time points $t_1$ and $t_2$ do not mean load changes on the vehicle or the air springs. The state of the control apparatus SG is shown in the lower diagram where the state of SG is plotted as a function of time. At time point $t_1$, the state of the control apparatus SG changes from active to sleep.

After a pregiven time span $\Delta=t_2-t_1$, the control apparatus SG is automatically transferred from the sleep mode (sleep) into the active state (active). The actual level elevation $h_2(t_2)$ is determined at time point $t_2$. The actual level elevation $h_2(h(t_2))$ at time point $t_2$ lies below the threshold value $h_{su}$. In this way, the condition $\{h(t_1)-h(t_2)\}*K_3/(t_2-t_1)>K_2$ for an elevation level change from time point $t_1$ to time point $t_2$ is satisfied. $K_2$ and $K_3$ are freely selectable constants and are dependent upon the characteristics of the vehicle.

Since the threshold $K_2$ has been exceeded, the actual pressure $p(t_2)$ is determined which, in this case, corresponds to the desired pressure $p_s$. The further condition for a detection of a leakage is then satisfied, namely, that no pressure change takes place in accordance with the condition $(p_1-p_2)>K_1$. A leakage in the corresponding air spring is detected and a wheel-specific counter $Z_T$ (not shown) is incremented. A leakage fault is detected when the wheel-specific counter $Z_T$ exceeds a threshold value, for example, the value 2. The leakage fault can be displayed optically and/or be provided acoustically in the vehicle and is stored parallelly in a permanent memory of the control apparatus SG for maintenance purposes.

At time point $t_2$, the control apparatus SG detects a drop below the threshold value $h_{su}$ at the corresponding air spring and initiates an up-control operation of the air spring up to the desired level elevation $h_s$. The air pressure p(t) in the corresponding air spring does not change in this time span because no load change was undertaken at the vehicle or at the air spring. After reaching the desired level elevation $h_s$, the control apparatus SG is transferred from the active state (active) to the sleep mode (sleep).

The control apparatus SG can be transferred automatically from the state "sleep" into the state "active" after a pregiven time span (not shown). Thereafter, the procedure shown at time point $t_2$ is run and the actual level elevation h(t) and, if required, the pressure p(t) is determined and is compared to the measuring results of the previous time point (old time point $t_2$). With a renewed drop below the threshold value $h_{su}$ by the actual level elevation h(t) and the satisfaction of the pressure condition $(p_1-p_2)>K_1$, the wheel-specific counter $Z_T$ is incremented anew. If there is no drop below threshold $h_{su}$ at the new time point $t_2$, then no pressure $p_2$ is determined and the wheel-specific counter $Z_T$ is decremented down to a minimum to the value 0.

Figure 3B:
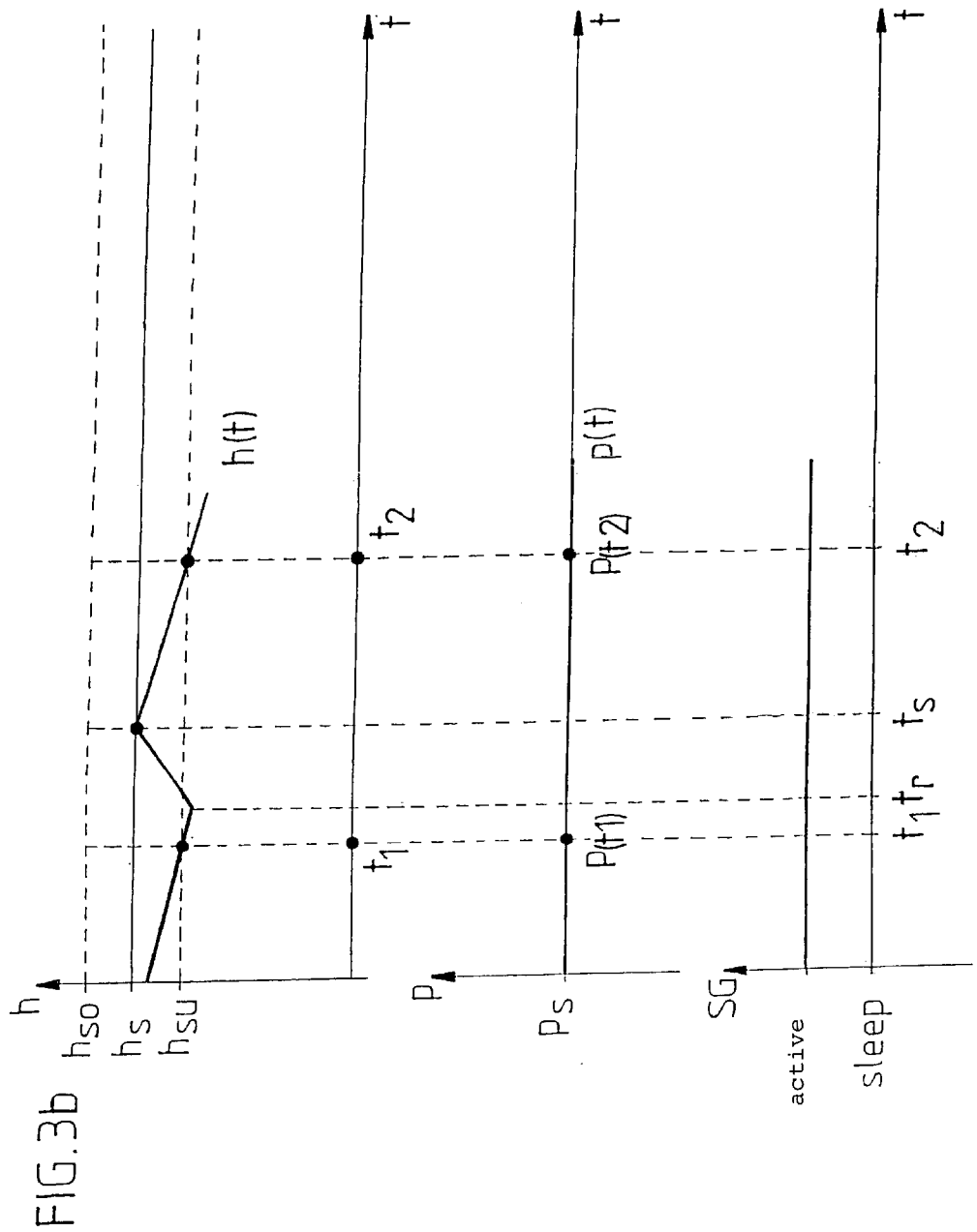
FIG. 3b is a plot of the elevation signal state, pressure state and SG-state as a function of time for a second time sequence; and, FIG. 4 is a plot showing the after-phases of the control apparatus after switch off of the ignition (KL15).

FIG. 3b shows another time-dependent trace of the elevation signal h(t) and the pressure signal p(t) of an air spring and of the state of the control apparatus SG. The control apparatus SG in FIG. 3b is always active and does not change its state within the time run. It is, however, also possible that the control apparatus SG is in the sleep mode before, between and after the given time points $t_1$, $t_r$, $t_s$ and $t_2$. The pressure p(t) likewise does not change over the entire time span and corresponds to the desired pressure $p_s$. The actual level elevation h1 drops below or reaches threshold value $h_{su}$ at time point $t_1$. A leakage is not detected because no previous time point for comparing the elevation and pressure signals is present. At time point $t_1$, a control requirement of the air spring however is detected. An up-control operation of the air spring is started at time point $t_r$ and is ended at time point $t_s$ when the actual level elevation $h_r$ corresponds to the desired level elevation $h_s$.

The actual level elevation $h_2$ reaches or drops anew below the threshold value $h_{su}$ at a further time point $t_2$ which is later in time. If this takes place after a pregiven time span $\Delta t=t_2-t_1$ and the condition 1 wherein $(p_1-p_2)>K_1$ and the condition 3 wherein $t_2-t_1<T_{Limit}$ are satisfied, then a leakage is detected and a wheel-specific counter $Z_T$ is incremented. Or, after a pregiven time span (for example, $t_2+(t_r-t_1)$) the actual level elevation is determined without an up-control operation being carried out at the air spring. The actual level elevation $h_2$ at the air spring at time point $t_2+(t_r-t_1)$ has so changed relative to the actual level elevation $h_1$ at time point $t_1$ that the threshold value $K_2$ is exceeded. A leakage at the air spring is detected and the wheel-specific counter $Z_T$ is incremented.

If the leakage at an air spring is detected several times and if the wheel-specific counter $Z_T$ reaches or exceeds a pregiven threshold value $K_4$, then a leakage fault is detected. The leakage fault is displayed optically and/or is provided acoustically in the vehicle and can be stored in a fault memory of the control apparatus SG. The leakage can also be displayed directly as a leakage fault of the corresponding air spring in the vehicle acoustically and/or optically. Or, an up-control operation is carried out at the corresponding air spring up to the desired level elevation $h_s$. If an up-control operation is executed after the time point $t_2$, then, the illustrated sequence shown at time point $t_2$ begins anew when there is a drop below the threshold value $h_{su}$.

Figure 4:
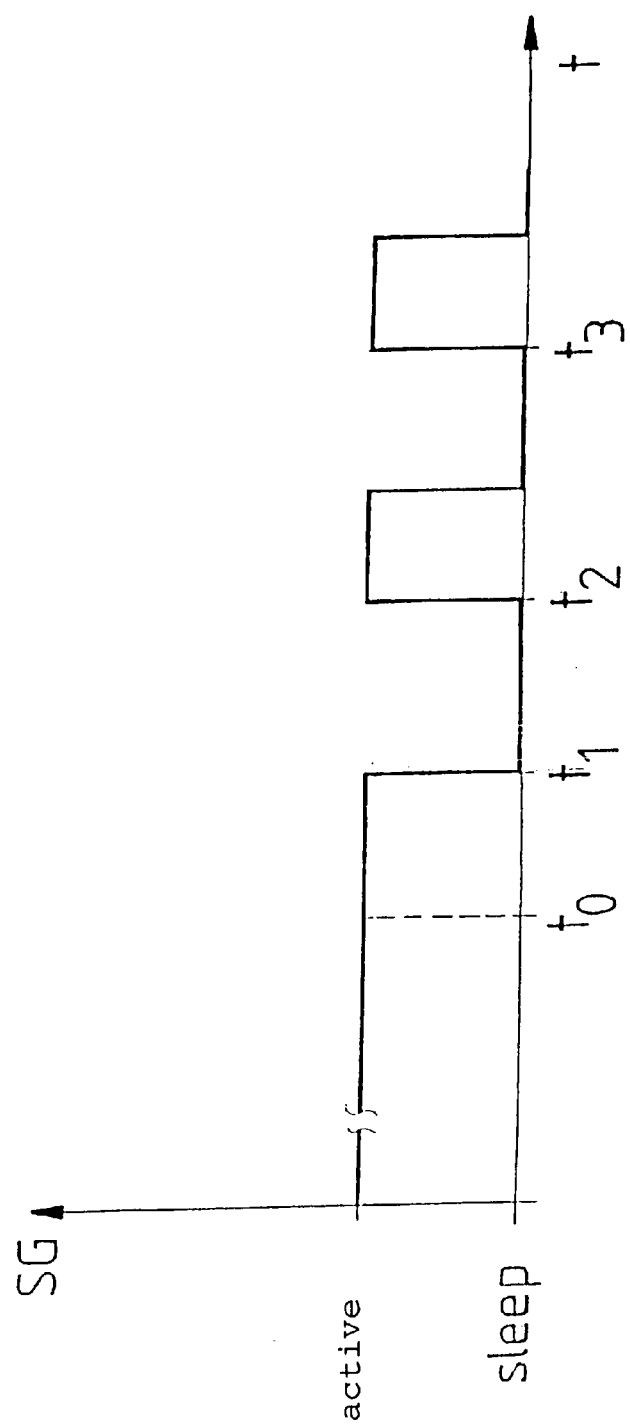

FIG. 4 shows the time-dependent trace of the states "active" and "sleep" in the control apparatus SG. At time point to, the ignition K15 is switched off. The control apparatus is transferred only after an after-run phase $t_1-t_0$ from the state "active" into the state "sleep". After a pregiven time span $t_2-t_1$ at time point $t_2$, the control apparatus is automatically transferred from the sleep state into the active state. An after-run phase begins wherein the actual level elevation of the air springs as well as the pressure in the individual air springs is determined. If the conditions for the pressure and the elevation level are satisfied so that the threshold values $K_1$ and $K_2$ are reached or exceeded, then a leak at the corresponding air spring is detected. An up-control operation at the corresponding air spring is carried out. When the wheel-specific counter $Z_T$ exceeds, a leakage fault is detected which is displayed to the operator of the vehicle. After the up-control operation or after no leakage was detected ($K_1$ and $K_2$ were not reached or exceeded), the control apparatus SG automatically transfers from the active state into the sleep state.

The control apparatus SG is again transferred from the sleep state into the active state after a fixed pregiven time span $t_3-t_2$ which must not correspond to the time span $t_2-t_1$.

The check as to leakage in accordance with the foregoing is carried out anew. The operation of the automatic waking of the control apparatus SG from the sleep state to the active state can be repeated as often as possible after fixedly pregiven time spans.

It is understood that the foregoing description is that of the preferred embodiments of the invention and that various changes and modifications may be made thereto without departing from the spirit and scope of the invention as defined in the appended claims.

What is claimed is:

1. A method for detecting leakages in a motor vehicle air spring system including a plurality of air springs and having a level control arrangement, the level control arrangement including: an electronic control apparatus; a plurality of elevation determination sensors associated with corresponding ones of said air springs; a pressure sensor; a plurality of air spring valves corresponding to respective ones of said air springs and a compressor; said elevation determination sensors and said pressure sensor being connected to said control apparatus for supplying signals thereto; said control apparatus functioning to process said signals for controlling said air spring valves and said compressor for controlling the motor vehicle upwardly or downwardly in elevation; the method comprising the steps of:

at a first time point ($t_1$), measuring the elevation-distance values ($h_1$) and the corresponding air pressure ($p_1$) for each air spring and storing said elevation-distance values with the time of measurement with said first time point ($t_1$) being selected so that said control apparatus is either transferred from an active mode into a sleep mode or the corresponding elevation-distance value ($h_1$) drops below a threshold value ($h_{su}$);

at a second time point ($t_2$), measuring the elevation-distance value ($h_2$) and, if needed, the air pressure ($p_2$) in the corresponding air springs with said second time point ($t_2$) being so selected that either a pregiven time span ($\Delta t$) has elapsed relative to the time point ($t_1$) and/or the corresponding elevation-distance value ($h_2$) has dropped below a threshold value ($h_{su}$) whereby a control need is recognized; and, detecting a leakage of a particular air spring when no desired level change ($h_s$) takes place between said first time point ($t_1$) and said second time point ($t_2$) and, at this particular air spring, only a pressure change was determined from said first time point ($t_1$) to said second time point ($t_2$) in accordance with a first condition ($p_1-p_2$)>$K_1$ and, simultaneously, an elevation change ($h_2$) was determined in accordance with a second condition $$\{h(t_1)-h(t_2)\}*K_3/(t_2-t_1)>K_2.$$

2. The method of claim 1, wherein those air springs are used to detect a leakage which are the lowest in elevation.

3. The method of claim 2, wherein those air springs are used which are at the lowest elevation-distance value (h2) in accordance with the condition Min($K_{2,VL}$, $K_{2,VR}$, $K_{2,HL}$, $K_{2,HR}$).

4. The method of claim 3, wherein for at least one air spring, a wheel-specific counter ($Z_T$) is incremented for at least one air spring when a leak of the corresponding air spring is detected.

5. The method of claim 4, wherein a leakage fault of an air spring is detected when a wheel-specific counter ($Z_T$) exceeds a threshold value ($K_4$) which is assigned to the corresponding air spring.

6. The method of claim 5, wherein the wheel-specific counters ($Z_T$) (VL, VR, HL, HR) of the corresponding air spring are decremented after a pregiven time span when the valves of the corresponding air springs have not been actuated within a pregiven time span and/or the elevation-distance values ($h_2$) of the corresponding air springs have not dropped below the threshold value ($h_{su}$) within the pregiven time span.

7. The method of claim 1, comprising the further steps of:

selecting the time point ($t_1$) when said control apparatus is transferred from said active state into said sleep mode; and, selecting the time point ($t_2$) in accordance with a pregiven time span ($\Delta t=t_2-t_1$);

at time point ($t_2$), transferring said control apparatus out of said sleep mode into the active mode; and, detecting leakage and measuring the corresponding air pressures ($p_2$) (VL, VR, HL, HR) in the air springs only after there is a drop below the threshold value ($h_{su}$) at least one of said air springs.

8. The method of claim 7, wherein an up-control operation in the corresponding air spring takes place up to the desired level ($h_s$) of the threshold values ($h_{su}$) and ($h_{so}$) after there is a drop below the threshold value ($h_{su}$) at one of the air springs.

9. The method of claim 7, wherein said control apparatus transfers from the active state into the sleep mode when the ignition of the motor vehicle is switched off.

10. The method of claim 8, wherein said control apparatus is transferred from the active state into the sleep mode after all required up-control operations are ended.

11. The method of claim 7, wherein said control apparatus is transferred from the active state into the sleep mode when, after a time point ($t_2$), no leakage detection takes place and/or there was no drop below the threshold value ($h_{su}$) at any of said air springs.

12. The method of claim 1, wherein the leakage and/or the leakage fault of the corresponding air spring or the air spring system in said motor vehicle is displayed acoustically or visually and/or a leakage and/or a leakage fault is stored in the memory of said control apparatus.

13. An arrangement for detecting leakages in a motor vehicle air spring system including a plurality of air springs and having a level control arrangement, the level control arrangement including: an electronic control apparatus; a plurality of elevation determination sensors associated with corresponding ones of said air springs; a pressure sensor; a plurality of air spring valves corresponding to respective ones of said air springs and a compressor; said elevation determination sensors and said pressure sensor being connected to said control apparatus for supplying signals thereto; said control apparatus functioning to process said signals for controlling said air spring valves and said compressor for controlling the motor vehicle upwardly or downwardly in elevation; the arrangement comprising:

said control apparatus functioning to perform the following method steps:

at a first time point ($t_1$), measuring the elevation-distance values ($h_1$) and the corresponding air pressure ($p_1$) for each air spring and storing said elevation-distance values with the time of measurement with said first time point ($t_1$) being selected so that said control apparatus is either transferred from an active mode into a sleep mode or the corresponding elevation-distance value ($h_1$) drops below a threshold value ($h_{su}$);

at a second time point ($t_2$), measuring the elevation-distance value ($h_2$) and, if needed, the air pressure ($p_2$) in the corresponding air springs with said second time point ($t_2$) being so selected that either a pregiven time span ($\Delta t$) has elapsed relative to the time point ($t_1$) and/or the corresponding elevation-distance value ($h_2$) has dropped below a threshold value ($h_{su}$) whereby a control need is recognized;

detecting a leakage of a particular air spring when no desired level change ($h_s$) takes place between said first time point ($t_1$) and said second time point ($t_2$) and, at this particular air spring, only a pressure change was determined from said first time point ($t_1$) to said second time point ($t_2$) in accordance with a first condition ($p_1-p_2$)>$K_1$ and, simultaneously, an elevation change ($h_2$) was determined in accordance with a second condition $$\{h(t_1)-h(t_2)\}*K_3/(t_2-t_1)>K_2;$$

and, said control apparatus including a function logic which is operatively connected to said elevation determination sensors, said pressure sensor and said air spring valves in such a manner that a leakage of the air spring system or the corresponding air spring is detected at a corner of the motor vehicle when there is a pregiven desired level ($h_s$) between two pregiven time points ($t_1$, $t_2$) and when there are pressure changes in accordance with said first condition from the first time point ($t_1$) to the second time point ($t_2$) and when there is a simultaneous elevation level change in accordance with said second condition.

* * * * *

UNITED STATES PATENT AND TRADEMARK OFFICE
CERTIFICATE OF CORRECTION

PATENT NO. : 6,745,614 B2
DATED : June 8, 2004
INVENTOR(S) : Alexander Stiller

It is certified that error appears in the above-identified patent and that said Letters Patent is hereby corrected as shown below:

Column 2,
Line 4, -- at -- should be inserted between "level" and "at".

Column 6,
Line 47, delete "to" and substitute -- $t_0$ -- therefor.

Column 8,
Line 21, -- at -- should be inserted before "least".

Signed and Sealed this

Twenty-eighth Day of December, 2004

JON W. DUDAS
*Director of the United States Patent and Trademark Office*